US012123971B2

(12) United States Patent
Cole et al.

(10) Patent No.: US 12,123,971 B2
(45) Date of Patent: Oct. 22, 2024

(54) CALIBRATION AND OPERATION OF VEHICLE OBJECT DETECTION RADAR WITH INERTIAL MEASUREMENT UNIT (IMU)

(71) Applicant: PRECO ELECTRONICS, LLC, Boise, ID (US)

(72) Inventors: Jonathan Paul Cole, Caldwell, ID (US); Jonathan Edward Fix, Boise, ID (US)

(73) Assignee: Preco Electronics, LLC, Boise, ID (US)

( * ) Notice: Subject to any disclaimer, the term of this patent is extended or adjusted under 35 U.S.C. 154(b) by 522 days.

(21) Appl. No.: 17/548,363

(22) Filed: Dec. 10, 2021

(65) Prior Publication Data

US 2022/0187420 A1    Jun. 16, 2022

Related U.S. Application Data

(60) Provisional application No. 63/123,777, filed on Dec. 10, 2020, provisional application No. 63/123,730, filed on Dec. 10, 2020.

(51) Int. Cl.
*G01S 7/40* (2006.01)
*B60R 11/00* (2006.01)
(Continued)

(52) U.S. Cl.
CPC ............... *G01S 7/40* (2013.01); *B60W 40/02* (2013.01); *B60W 40/11* (2013.01);
(Continued)

(58) Field of Classification Search
CPC .. B60W 2402/408; G01S 7/40; G01S 7/4034; G01S 7/403; G01S 13/931;
(Continued)

(56) References Cited

U.S. PATENT DOCUMENTS 5,245,909 A  *  9/1993  Corrigan ................. F41G 3/326
                                                89/41.19
8,037,754 B2 *  10/2011  Eriksen ................ G01C 21/166
                                                73/493

(Continued)

FOREIGN PATENT DOCUMENTS

WO         2019202072 A1    10/2019

OTHER PUBLICATIONS

Office Action for U.S. Appl. No. 17/548,413, mailed on Apr. 25, 2024, Cole, "Calibration of Vehicle Object Detection Radar With Inertial Measurement Unit (IMU)", 21 pages.

*Primary Examiner* — Peter M Bythrow
(74) *Attorney, Agent, or Firm* — Lee & Hayes, P.C.

(57) ABSTRACT

The disclosed technology is a vehicle object detection radar system incorporating an inertial measurement unit (IMU). The IMU may obtain input signals of, or relating to, for example, relative motion, acceleration, object detection angle, sway and vibration of the vehicle and/or any towed trailer, and process them for relay to the vehicle operator as operating information and possibly alarms. Also, the obtained IMU signals may be relayed directly to the vehicle's object detection radar systems and central control for automatic adjustment and control thereof.

17 Claims, 11 Drawing Sheets

(51) Int. Cl.
  *B60R 11/02* (2006.01)
  *B60W 40/02* (2006.01)
  *B60W 40/11* (2012.01)
  *B60W 40/112* (2012.01)
  *B60W 40/114* (2012.01)
  *B60W 50/06* (2006.01)
  *G01C 21/16* (2006.01)
  *G01S 13/931* (2020.01)

(52) U.S. Cl.
  CPC ......... *B60W 40/112* (2013.01); *B60W 40/114* (2013.01); *G01C 21/16* (2013.01); *G01S 13/931* (2013.01); *B60R 2011/004* (2013.01); *B60R 11/02* (2013.01); *B60W 50/06* (2013.01); *B60W 2420/408* (2024.01); *G01S 2013/93274* (2020.01)

(58) Field of Classification Search
  CPC ....... G01S 2013/932; G01S 2013/9315; G01S 2013/93274
  See application file for complete search history.

(56) References Cited

U.S. PATENT DOCUMENTS

| | | | | |
|---|---|---|---|---|
| 9,568,592 B1* | 2/2017 | Brown | ................ | G01S 7/4004 |
| 9,933,515 B2* | 4/2018 | Prokhorov | ............ | G01S 7/4972 |
| 10,867,489 B1* | 12/2020 | Diehl | ................ | G08B 13/06 |
| 11,623,686 B1* | 4/2023 | Thalman | ................ | G01S 19/42 |
| | | | | 701/41 |
| 11,726,189 B2* | 8/2023 | Jian | ................ | G01S 7/4972 |
| | | | | 356/4.01 |
| 11,747,142 B2* | 9/2023 | Jain | ................ | G01S 19/49 |
| | | | | 701/472 |
| 11,794,754 B2* | 10/2023 | Lee | ................ | B60T 8/17551 |
| 11,940,555 B2* | 3/2024 | Pinnock | ................ | G01S 7/4034 |
| 11,970,176 B2* | 4/2024 | Hosoya | ................ | B60W 40/107 |
| 2010/0168957 A1* | 7/2010 | Takahashi | ............ | G01S 17/931 |
| | | | | 701/29.2 |
| 2014/0333473 A1* | 11/2014 | Steinbuch | ............ | G01S 7/4004 |
| | | | | 342/174 |
| 2016/0161602 A1* | 6/2016 | Prokhorov | ............ | G01S 7/4972 |
| | | | | 702/97 |
| 2017/0234988 A1* | 8/2017 | Jafari | ................ | G01C 21/12 |
| | | | | 701/1 |
| 2018/0362010 A1* | 12/2018 | Yildirim | ................ | B60Q 9/00 |
| 2019/0064364 A1* | 2/2019 | Boysel | ................ | G05D 1/027 |
| 2019/0186920 A1* | 6/2019 | Leach | ................ | G05D 1/027 |
| 2019/0293756 A1* | 9/2019 | Blaes | ................ | G01S 7/4026 |
| 2021/0123754 A1* | 4/2021 | Mordechai | ............ | H04W 4/026 |
| 2021/0149020 A1* | 5/2021 | Pinnock | ............ | G01S 13/86 |
| 2021/0215791 A1* | 7/2021 | Abari | ................ | G01S 7/403 |
| 2021/0247506 A1* | 8/2021 | Knutson | ................ | G01S 17/86 |
| 2021/0334565 A1 | 10/2021 | Roche | | |
| 2021/0339710 A1* | 11/2021 | Adams | ................ | G01S 15/931 |
| 2022/0178726 A1* | 6/2022 | Robinson | ............ | G01C 25/005 |
| 2022/0187421 A1 | 6/2022 | Cole et al. | | |

\* cited by examiner

β Angle Initial Calibration

α Angle Initial Calibration

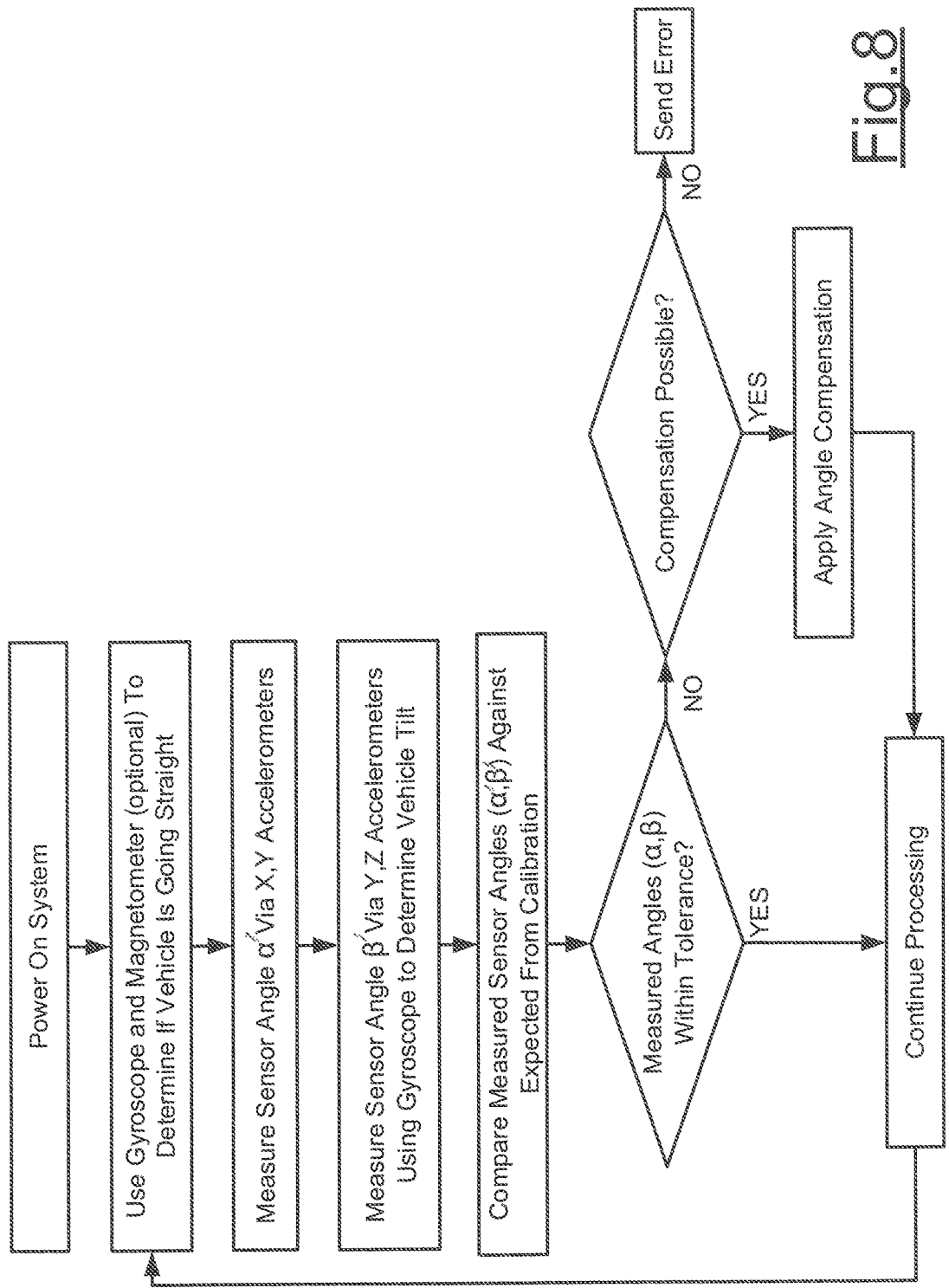

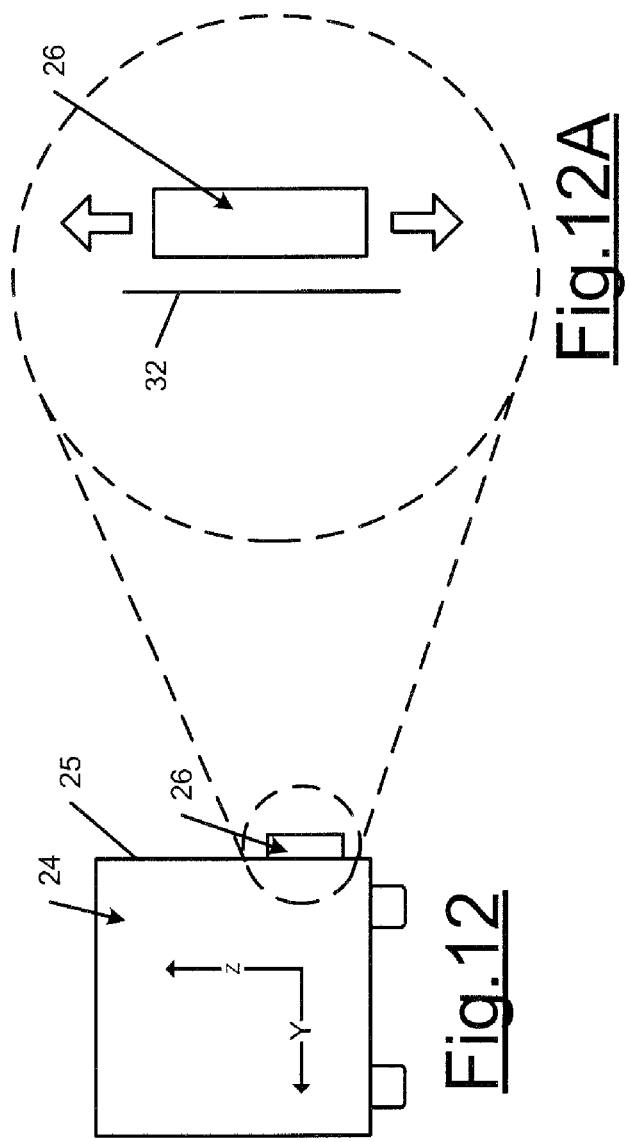

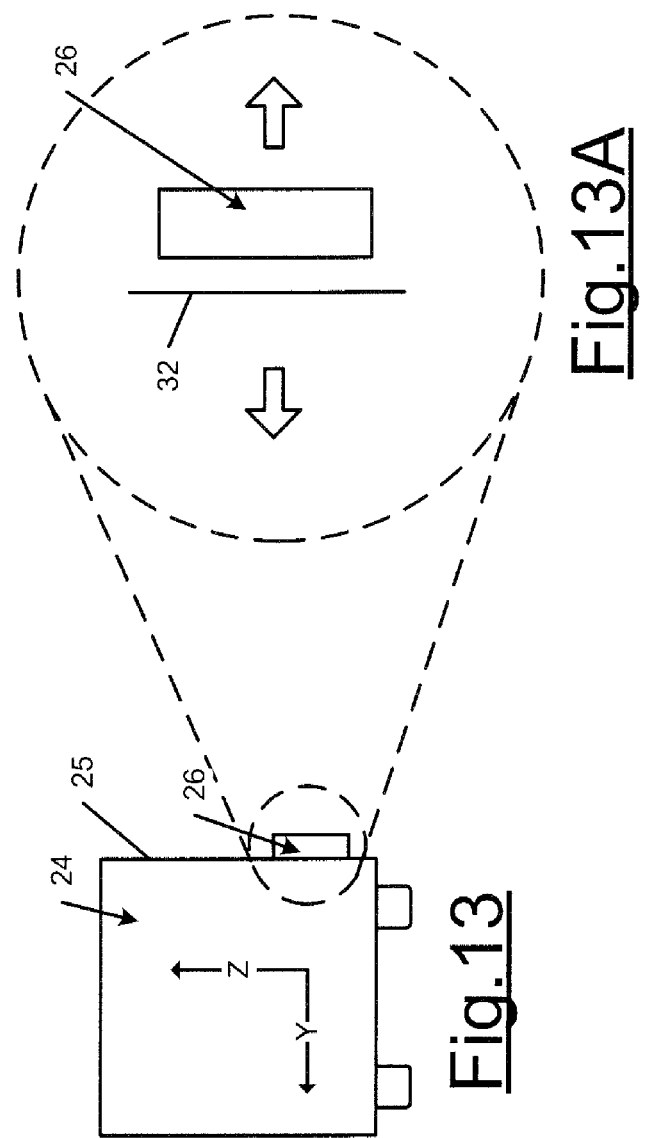

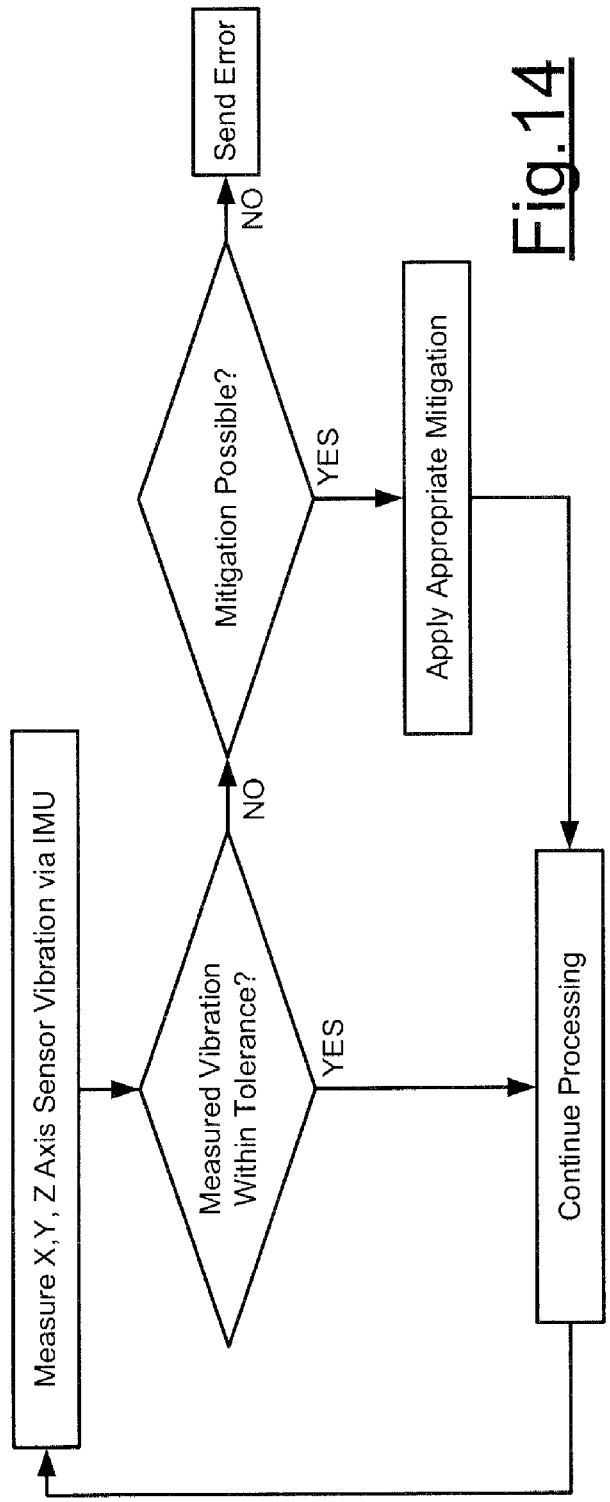

CALIBRATION AND OPERATION OF VEHICLE OBJECT DETECTION RADAR WITH INERTIAL MEASUREMENT UNIT (IMU)

This application claims benefit of U.S. Provisional Application Ser. No. 63/123,730, filed Dec. 10, 2020, entitled Calibration of Vehicle Object Detection Radar With Inertial Measurement Unit (IMU), and claims benefit of U.S. Provisional Application Ser. No. 63/123,777, filed Dec. 10, 2020, entitled Operation of Vehicle Object Detection Radar With Inertial Measurement Unit (IMU), the entire disclosures of both US Provisional Applications being incorporated herein by this reference.

BACKGROUND OF THE DISCLOSED TECHNOLOGY

Field of the Disclosed Technology

This disclosed technology relates generally to vehicle object detection radar systems. More specifically, this disclosed technology relates to such radar systems incorporating an inertial measurement unit (IMU) to alert, and if necessary enable, the vehicle's operator, or the vehicle's automatic monitoring and control systems, to adjust to issues resulting from dynamic changes in the vehicle, towed trailer if any, and/or environment of the radar system.

Related Art

An exemplary conventional inertial measurement unit (IMU) is Delphi's Electronically Scanning Radar (ESR) (https://www.delphi.com). Another exemplary conventional IMU is the VN-100 IMU/AHRS of VectorNav of Dallas, TX, USA (https://www.vectornav.com/products).

SUMMARY OF THE DISCLOSED TECHNOLOGY

The present invention is a vehicle object detection radar system incorporating an IMU. The IMU may obtain input signals of, or relating to, for example, range, relative motion, acceleration, object detection angles, plus vehicle sway/tilt, bounce and vibration. The IMU may share or send these input signals to the vehicle object detection radar system and/or operator, or to other of the vehicle's monitoring/control systems, or even remotely to other receiver(s) as data.

In certain embodiments, the presently-disclosed technology is a vehicle-mounted, preferably side-directed, object-detection radar system including a radar sensor incorporating an IMU. In another embodiment, the presently-disclosed technology is an integral, self-contained radar object-detection package, including a radar sensor and an incorporated IMU, for after-market installation on a side of a vehicle or a to-be-towed trailer. In another embodiment, the presently-disclosed technology is a radar object-detection package having an IMU that contains accelerometer, gyroscope and magnetometer components integrated together within a radar sensor package.

The presently-disclosed technology may comprise apparatus and/or methods that comprise an IMU, or individual accelerometer(s), gyroscope and magnetometer components integrated together within a radar sensor package for installation on/in a vehicle and/or trailer. Certain embodiments, of the apparatus and methods comprising the IMU or individual components or use thereof, comprise calibration of the radar sensor package to account for the position/angle(s) of the installed radar sensor face. Certain embodiments of the apparatus and methods, comprising the IMU or individual components or use thereof, may comprise accounting for operational stresses on the installed radar object-detection package, for example, from tilt or incline of the vehicle and/or the trailer, or from bounce or vibration of the vehicle and/or the trailer during transit, and/or accounting for changes in the apparatus due to damage or wear.

Calibration:

Typically, precise mounting is required for proper operation of such radar systems. According to the presently disclosed technology, on the other hand, with an IMU the system may be conveniently and effectively calibrated for mounting error. Also, this way, the radar system need not be mounted on the vehicle within very small tolerances, which is the current practice. The presently-disclosed technology allows the radar to be mounted instead with wider tolerances, resulting in savings of time, effort and expense.

The presently-disclosed technology may exist in multiple embodiments, for example, to account for errors during installation of the radar object-detection package. Also, it may account for errors due to movement/displacement of the radar object-detection package resulting from impact damage, or errors resulting from wear-and-tear or failure of any of the securement components for the radar package on a side of the vehicle or trailer. Also, it may account for errors resulting from a change of height of the vehicle due to different suspensions, different tires, or adjustable height settings for the vehicle or trailer or their suspensions.

To provide one or more or all of these features is an objective of the presently-disclosed technology.

To calibrate for error, for example due to radar packaging mounting error or radar package or vehicle side surface damage that changes the position/orientation of the radar package, an IMU is preferably built into the printed circuit assembly (PCA) of a radar system such that one axis aligns parallel to the x-axis of the face of the sensor, and another axis aligns perpendicular to the face of the sensor (the z-axis). Then, to calculate an offset angle $\alpha$ between the actual moving straight go-ahead or go-back direction and the IMU's accelerometer's x-axis, its position is monitored while accelerating and/or decelerating the vehicle in a straight line. To ensure that the vehicle is being driven in a straight line at this time, the gyroscope component of the IMU is monitored while accelerating/decelerating for any motion that indicates turning. Alternatively or additionally to the gyroscope component, in certain embodiments, GPS heading information and/or vehicle CAN (controller area network) steering position data, may be used to indicate the turning/moving-straight condition.

This way, the installed radar object-detection and IMU package may observe a straight, go-ahead or go-back movement direction of the vehicle or trailer along an observed second x-axis in order to determine a first offset angle $\alpha$, the difference between the radar sensor face first x-axis and the observed vehicle straight-ahead or go-back movement direction, that is, the second x-axis. Then, upon calculating the angle between the straight direction of the vehicle/trailer (which direction is also the x-axis of the truck/trailer side surface upon which the radar package is mounted, if the side surface is planar and parallel to said straight direction of the vehicle/trailer, as it typically for many undamaged truck/trailer sidewalls) and the radar sensor face first x-axis, any measured deviation from 0° is angle $\alpha$, the mounting error. The first x-axis location and resulting angle $\alpha$, detected during calibration, then becomes the "expected" position/angle of the radar sensor face x-axis. Then, upon subsequent operation of the radar object detection system comprising measurement(s) of angle α, deviations from the expected angle α may be taken into account in object/target detection and/or signaled as an error, depending on the amount/extent of the deviation.

Also, this way the installed radar object-detection and IMU package may confirm said straight, go-ahead or go-back, movement of the vehicle by the gyroscope component of the IMU being adapted to detect turning and/or any direction of the vehicle or trailer along the first y-axis.

Also, this way the installed radar object-detection IMU package may observe a downward and/or upward movement direction of the vehicle or trailer principally in the earth's gravitational field along an observed second z-axis in order to determine a second offset angle β, the difference between the radar sensor face first z-axis and the observed gravitational field direction, that is, the second z-axis.

Then, to calculate β, the angle between a line perpendicular to the ground (and approximately parallel to the acceleration of the earth's gravitational field) and the face of the radar sensor, the IMU's z-axis accelerometer position is monitored, and any measured deviation from 0° is β, the mounting error. Similarly as with the detection of angle α during calibration, the first z-axis location and resulting angle β detected during calibration, becomes the "expected" position of the radar sensor face z-axis. Upon subsequent operation, deviations from the expected may be taken into account in object/target detection and/or signaled as an error, depending on the amount/extent of the deviation.

The calibration process may be completed once, and the α and β values stored in memory. Or, the calibration process may also be done periodically, or even continuously for α wherein updated α values may in certain embodiments be calculated every time a moving-straight condition of the vehicle/trailer is detected.

Many commercial IMU's are now manufactured in excellent quality and large quantities. As a result, they tend to be currently available at reasonable prices. This way, as in some embodiments of the presently-disclosed technology, it is economical to design for, specify, and use commercially-available IMUs, even if not all available functions of the commercially-available IMU are planned to be used. In some of the present embodiments, for example, the magnetometer component may not be used. The accelerometer and gyroscope components, however, are used for their respective functions. Still, it may be economically advantageous to install a current, commercial, "off-the-shelf" IMU in many embodiments of the presently-disclosed technology.

In some circumstances however, singular, stand-alone accelerometer and gyroscope components of high quality and low-price may become available and economically attractive for use in the presently-disclosed technology. Then, a current, classic IMU, with possibly more than needed components/functions as discussed above, may not be necessary, and the stand-alone accelerometer and gyroscope components may be designed for, specified, and/or manufactured, and used, either separately or together to practice the presently-disclosed technology.

Ongoing Operation:

This disclosed technology also relates to methods and apparatus for the ongoing use, preferably after calibration as discussed herein, of radar technology for detecting hazards for motor vehicles and other equipment. More especially, certain embodiments relate to monitoring angle alpha prime (α'), angle beta prime (β'), x-axis, y-axis, and z-axis vibration, and z-axis acceleration due to larger z-axis movement, to compensate for or mitigate inaccurate or false detections due to operational stresses such as undesirable dynamic motion and/or changes in the apparatus due to damage or wear. The undesirable dynamic motion and/or apparatus changes may be due to the dynamics of driving of the vehicle/trailer, the effects of road condition, and/or a changing sensor package and vehicle/trailer condition such as may result from damage, or wear.

Radar systems mounted to vehicles are subject to very dynamic conditions. Such as sway/tilt of the vehicle, vibration and sudden bounces. These dynamics can induce undesirable nuisance alerts. Using an embedded IMU, the radar can monitor and mitigate the effects of the undesirable vehicle dynamics.

All vehicles tilt (sway) while turning or making other maneuvers. This is especially true for larger vehicles. The tilt can be substantial enough to change the relative position between a radar sensor mounted to the vehicle and the ground. Depending on the maneuver, the result of the tilt could point the radar sensor towards the ground, inducing a false detection. Using an embedded IMU, the radar system can determine if the tilt of a vehicle is such that a detection of the ground is expected. When this condition occurs, certain embodiment of this disclosed radar system may automatically adjust their detection pattern or otherwise mitigate the false detection.

Vehicles vibrate for many reasons. That means radar sensors mounted to these vehicles vibrate accordingly. These vibrations can induce errors in the doppler measurements of a radar sensor. Using an embedded IMU, certain embodiments of the disclosed radar system can sense this vibration and compensate for the vibration or signal the need to mitigate the cause of the vibration.

It is not uncommon for vehicles to be subjected to large impulses or bounces, for example, due to potholes or speed bumps. A radar system mounted to a vehicle and subjected to a large bounce has a higher potential to produce a false positive due to the induced doppler error or perhaps even detecting the ground. Using an embedded IMU, certain embodiment of the disclosed radar system can detect large bounces and appropriately mitigate the alerts.

An Inertial Measurement Unit (IMU) should be embedded on the Printed Circuit Assembly (PCA) of the radar system, such that one axis aligns parallel to the face of the sensor (or "the beam face" or the "exterior face") and another axis perpendicular to the face of the sensor (or "the beam face" or the "exterior face"). In certain embodiments, one or more, and preferably three, separate dynamic conditions will be monitored, for example as described below. Consider the positive x-axis to be the forward direction of travel of the vehicle, the positive y-axis extending out of the face of the sensor and the positive z-axis is in the vertical direction towards the sky.

In certain embodiments, in order to determine if a vehicle's sway/tilt is enough for the ground to induce a false detection, the radar sensor monitors the embedded IMU's z-axis accelerometer, and/or in certain embodiments the y-axis accelerometer, and the radar microprocessor must also know the approximate mounting height of the radar sensor from the ground. The microprocessor can then mathematically determine if the ground is in the field of view. Once that is determined, the radar sensor can adjust the detection range automatically so that the ground is outside its range.

Vibration in the y-axis can induce errors in the doppler measurement. In certain embodiments, in order to mitigate the effects of this type of vibration, the embedded IMU's y-axis accelerometer must be continuously sampled to produce an array of samples. The radar sensor may then run a Fast Fourier Transform (FFT) on the sampled array. The resulting frequencies may then be subtracted from the radar target doppler information. In certain embodiments, vibrations, for example in any of the x, y, or z directions, are monitored and may be of a magnitude that an error/alert signal, such as an error/alert signal to a BIST system (built-in-self test) is produced so that the driver or other personnel may analyze the source of the vibration and mitigate it when possible.

If a large, sudden change in z-axis acceleration occurs, the radar sensor will consider it a bounce event. To determine if the vehicle is experiencing a "bounce" event, the radar sensor may monitor the embedded IMU's z-axis accelerometer. A bounce event may be distinguished from vibration, which is smaller than a bounce and typically repeated periodically and frequently, for example, with multiple vibrations occurring in series in a short-time period, for example, over at least 5-10 seconds. When this condition occurs, the radar sensor of certain embodiments may suppress any detections momentarily or adjust detection algorithms appropriately.

This way, the radar object-detection package may observe and measure rotation of the vehicle or trailer and therefore the radar object-detection package about the x-axis (in a plane generally parallel to the z-axis) in order to determine a tilt angle β' (beta prime) of the vehicle or trailer and radar object-detection package, for example due to vehicle/trailer turning. Also this way, the radar object-detection package may observe and measure bounce and vibration, both being short-time changes of the radar object-detection package about or along any of the x-, y-, or z-axes, but with vibrations typically being repeated frequently in a short period of time, and bounces being infrequent and spread out in time.

Many commercial IMU's are now manufactured in excellent quality and large quantities. As a result, they tend to be currently available at reasonable prices. This way, as in some embodiments of the presently-disclosed technology, it is economical to design for, specify, and use, commercially-available IMUs, even if not all available functions of the commercially-available IMU are planned to be used. In some of the present embodiments, for example, the magnetometer component may not be used. In this case, the accelerometer and gyroscope components, however, may be used for their respective functions. Still, it may be economically advantageous to install a current, commercial, "off-the-shelf" IMU in many embodiments of the presently-disclosed technology.

In some circumstances, singular, stand-alone accelerometer and gyroscope components of high quality and low-price may become available and economically attractive for use in the presently-disclosed technology. Then, a current, classic IMU, with more than needed components/functions as discussed above, may not be necessary, and the stand-alone accelerometer and gyroscope components may be designed for, specified, and/or manufactured, and used, either separately or together.

BRIEF DESCRIPTION OF THE DRAWINGS

FIG. 8 is a schematic flow diagram showing one embodiment of steps according to the invention that may be included as a portion of a radar object detection process, such as that in FIG. 1.

FIG. 11 is a rear schematic view like the one in FIG. 5, but with the trailer tipping to its right side due to the turning in FIG. 10, wherein FIGS. 10 and 11 illustrate turning and the resulting tilting such as may be monitored and adjusted-for in FIG. 9.

FIG. 12 is a rear schematic view like the one in FIG. 5.

FIG. 12A is an enlarged schematic detail view of the rear view of FIG. 12, but showing the radar object-detection sensor package moving up-and-down, for example, due to vibration or bumps.

FIG. 13 is a rear schematic view like the one in FIG. 5.

FIG. 13A is an enlarged schematic detail view of the rear view of FIG. 13, but with the radar object-detection sensor package moving side-to-side, for example, because of vibrations or damage or mounting problems.

FIG. 14 is a schematic flow diagram which depicts the steps to monitor vibrations such as the up-and-down movement as shown in FIG. 12A or side-to-side movement as shown in FIG. 13A, by using the UMI according to one embodiment of the presently-disclosed technology.

DETAILED DESCRIPTION OF CERTAIN EMBODIMENTS

Figure 1:
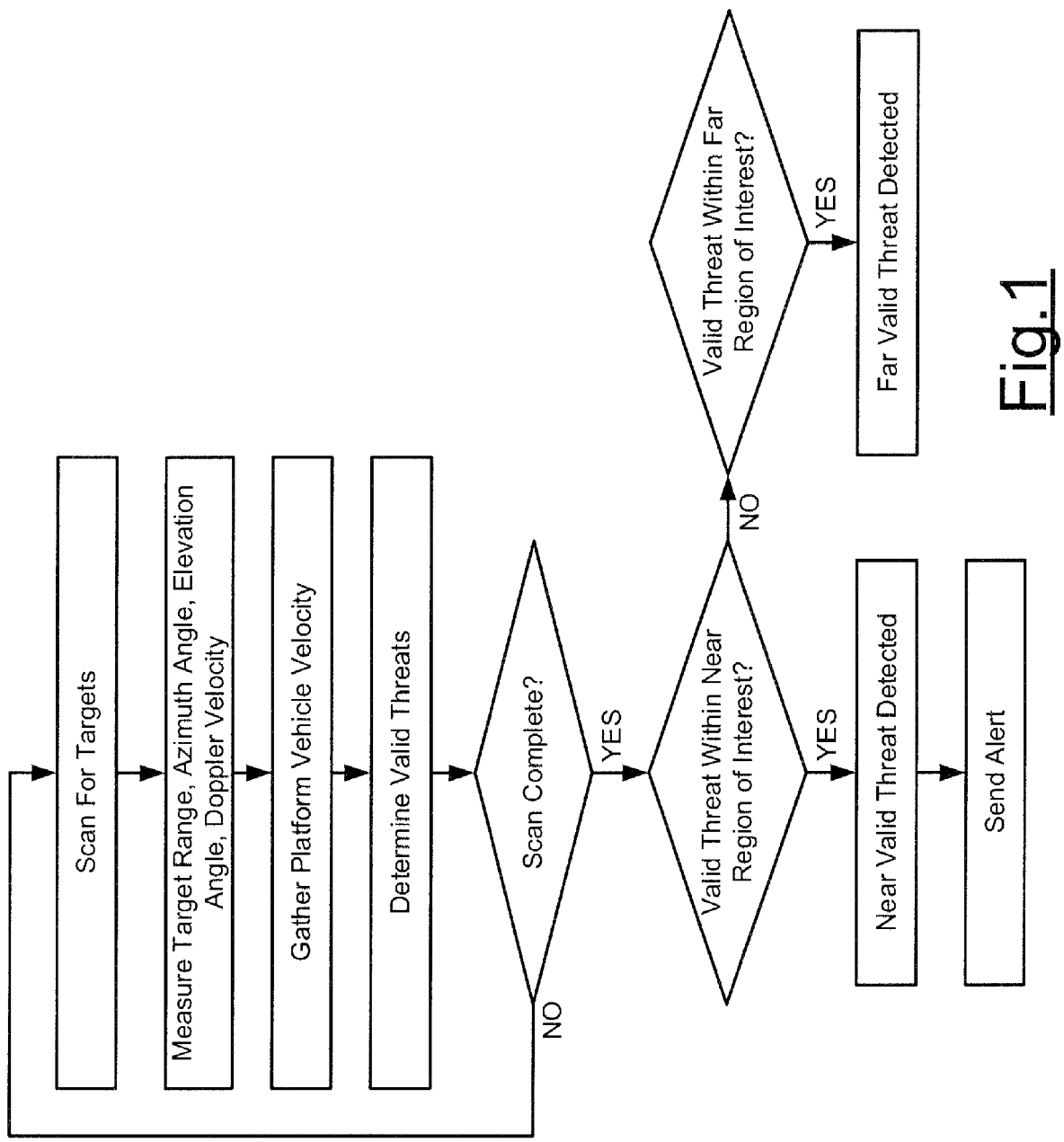
FIG. 1 is a schematic flow diagram which depicts simply and generally a radar object-detection process which may be utilized according to embodiments of the presently-disclosed technology.

Calibration of System for Radar Sensor Face Position:

Certain embodiments of the presently-disclosed technology comprise apparatus and/or methods for calibration of a radar object-detection system, and may be described as follows.

1. (Calibration for angle α) A dynamic misalignment error correction system for a vehicle-mounted side-directed object-detection radar system having:
    - an integral, self-contained radar object-detection sensor package adapted for after-market installation on a side of a vehicle or on a side of a trailer adapted to be towed by a vehicle, the radar object-detection sensor package having a radar sensor;
    - the radar sensor having a beam face (also, "exterior face" or "radar sensor face") with x, y and z Cartesian coordinate axes orientation, with the beam face being attached so that the x-axis is generally parallel to a straight line approximating the straight, go-ahead or go-back movement direction of the vehicle or trailer, the y-axis is generally parallel to a straight line approximating the horizon, and the z-axis is generally parallel to a straight line approximating the direction of the earth's gravitational field;
    - the radar sensor also being adapted, when installed on a side of a vehicle or trailer, to maintain a wide antenna pattern with a main lobe directed perpendicularly to the side of the vehicle or trailer so as to maintain radar coverage principally in next-adjacent, generally-parallel road lanes and next-far-adjacent, generally-parallel road lanes thereof;
    - the radar sensor also having an Inertial Measurement Unit (IMU) containing accelerometer (preferably each of a x-axis accelerometer, a y-axis accelerometer, and a z-accelerometer), gyroscope, and magnetometer components integrated together with the radar sensor in the self-contained radar object-detection sensor package;
    - the IMU being adapted to observe, by a first of the components of the IMU, an observed first x-axis of the radar sensor face, during a straight, go-ahead or go-back movement direction of the vehicle or trailer along an observed second x-axis, in order to determine an offset angle α that is the difference between the radar sensor face observed first x-axis and the observed vehicle movement direction observed second x-axis;
    - the straight, go-ahead or go-back movement of the vehicle or trailer being confirmed by a second component of the IMU adapted to detect any movement of the vehicle or trailer along the y-axis; and
    - the self-contained radar object-detection package being adapted to enter and save for future consideration the offset angle α for correction of any relevant radar sensor measurement.

2. The dynamic misalignment error correction system of item #1 above, wherein the first component of the IMU is adapted to observe acceleration and/or deceleration of movement (due to vehicle or trailer acceleration or deceleration) along the observed second x-axis in order to determine offset angle α and is the x-axis accelerometer component within the IMU.

3. The dynamic misalignment error correction system of item #1 above, wherein the second component of the IMU adapted to detect any movement of the vehicle or trailer along the y-axis is the gyroscope component within the IMU.

Or, certain embodiments of the presently-disclosed technology may also be described by the following:

4. (Calibration for angle β) A dynamic misalignment error correction system for a vehicle-mounted side-directed object-detection radar system having:
    - an integral, self-contained radar object-detection sensor package adapted for after-market installation on a side of a vehicle or on a side of a trailer adapted to be towed by a vehicle, the package having a radar sensor;
    - the radar sensor having a beam face (also, "radar sensor face") with a x, y and z Cartesian coordinate axes orientation, with the beam face being attached so that the x-axis is generally parallel to a straight line approximating the straight, go-ahead or go-back movement direction of the vehicle or trailer, the y-axis is generally parallel to a straight line approximating the horizon, and the z-axis is generally parallel to a straight line approximating the direction of the earth's gravitational field;
    - the radar sensor being adapted, when the radar object-detection package is installed on a side of a vehicle or trailer, to maintain a wide antenna pattern with a main lobe directed perpendicularly to the side of the vehicle or trailer so as to maintain radar coverage principally in next-adjacent, generally-parallel road lanes and the next-far-adjacent, generally-parallel road lanes thereof;
    - the radar sensor also having an Inertial Measurement Unit (IMU) containing accelerometer (preferably each of a x-axis accelerometer, a y-axis accelerometer, and a z-accelerometer), gyroscope, and magnetometer components integrated together with the radar sensor in the self-contained radar sensor package;
    - the IMU being adapted to observe by a first component of the IMU an observed first z-axis of the radar sensor face, in order to determine an offset angle β that is the difference between the radar sensor face observed first z-axis and an observed gravitational field direction that is an observed second z-axis generally corresponding to the downward and upward direction of the trailer in the earth's gravitational field; and
    - the self-contained radar sensor object-detection package being adapted to enter and save for future consideration the offset angle β for correction of any relevant radar sensor measurement.

5. The dynamic misalignment error correction system of item #4 above, wherein the first component of the IMU that is adapted to observe the first z-axis in order to determine the offset angle θ is the z-axis accelerometer component within the IMU.

6. The dynamic misalignment error correction system of item #4 above, wherein the vehicle or trailer is parked on a flat surface during observation of the first z-axis and the second z-axis, so that the vehicle or trailer is not tilted or turning and the second z-axis is perpendicular to the flat surface.

Or, certain embodiments of the presently-disclosed technology may also be described by the following:

7. (Calibration, for angles α and β) A dynamic misalignment error correction system for a vehicle-mounted side-directed object-detection radar system having:

an integral, self-contained radar sensor package adapted for after-market installation on a side of a vehicle or on a side of a trailer adapted to be towed by a vehicle, the radar sensor package having a radar sensor;

the radar sensor having a beam face (also, "exterior face" or "radar sensor face") with x, y and z Cartesian coordinate axes orientation, with the beam face being attached so that the x-axis is generally parallel to a straight line approximating the straight, go-ahead or go-back movement direction of the vehicle or trailer, the y-axis is generally parallel to a straight line approximating the horizon, and the z-axis is generally parallel to a straight line approximating the direction of the earths' gravitational field;

the radar sensor being adapted, when the package is installed on a side of a vehicle or trailer, to maintain a wide antenna pattern with a main lobe directed perpendicularly to the side of the vehicle or trailer, so as to maintain radar coverage principally in next-adjacent, generally-parallel road lanes and the next-far-adjacent, generally-parallel road lanes thereof;

the radar sensor also having an IMU (Inertial Measurement Unit) containing accelerometer (preferably each of a x-axis accelerometer, a y-axis accelerometer, and a z-accelerometer), gyroscope, and magnetometer components integrated together with the radar sensor in the self-contained radar sensor package;

the IMU being adapted to observe, by a first of the components of the IMU, an observed first x-axis of the radar sensor face, during a straight, go-ahead or go-back movement direction of the vehicle or trailer along an observed second x-axis, in order to determine an offset angle α that is the difference between the radar sensor face observed first x-axis and the vehicle movement direction observed second x-axis;

the straight, go-ahead or go-back movement of the vehicle or trailer being confirmed by a second component of the IMU adapted to detect any movement of the vehicle or trailer along the y-axis;

the IMU being adapted to observe by a third component of the IMU an observed first z-axis of the radar sensor face, in order to determine an offset angle β that is the difference between the radar sensor face observed first z-axis and a gravitational field direction that is an observed second z-axis; and the self-contained radar object-detection package sensor being adapted to enter and save for future consideration the first offset angle α and the second offset angle β for correction of any relevant sensor measurement.

8. The dynamic misalignment error correction system of item #7 above, wherein the first component of the IMU is adapted to observe acceleration and/or deceleration along the observed second x-axis in order to determine offset angle α and is the x-axis accelerometer component within the IMU.

9. The dynamic misalignment error correction system of item #7 above, wherein the second component of the IMU that is adapted to detect any movement of the vehicle or trailer along the y-axis, is the gyroscope component within the IMU.

10. The dynamic misalignment error correction system of item #7 above, wherein the third component of the IMU that is adapted to observe the first z-axis in order to determine the offset angle θ is the z-axis accelerometer component within the IMU.

11. The dynamic misalignment error correction system of item #7 above, wherein the vehicle or trailer is parked on a flat surface during observation of the first z-axis and the second z-axis, so that the vehicle or trailer is not tilted or turning and the vehicle/trailer z-axis is perpendicular to the flat surface, wherein the vehicle z-axis and the observed second z-axis that is the gravitational force direction are parallel.

Referring Specifically to Calibration FIGS. 1-7:

In the generalized schematic flow-chart diagram of FIG. 1, there are depicted in outline form several process steps, which a reasonably-skilled person in the art of vehicle object detection radar systems may understand and utilize for radar-based object detection. Said reasonably-skilled person in the art also will understand, once this document and the drawings have been reviewed, how to incorporate, into the process of FIG. 1 and the equipment represented by FIG. 1 and/or known in this field, methods and apparatus according to embodiments of the invention for practicing improved calibration of a radar sensor system and the resulting improved on-going operation of the radar sensor system.

Figure 2:
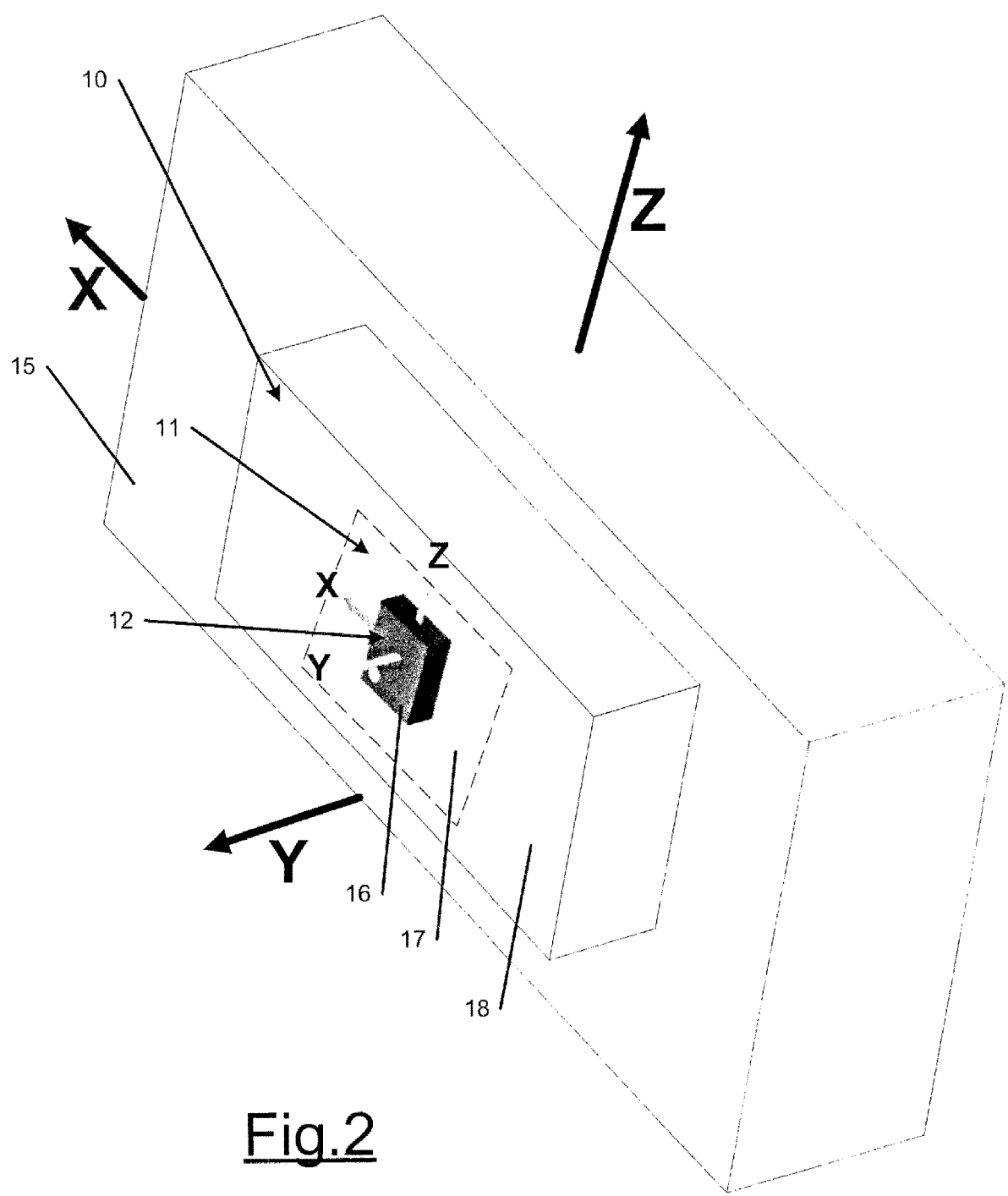
FIG. 2 is a top detail perspective left side view of a radar object-detection package according to one embodiment of the invention being attached to the left side of a trailer, for example.

In the schematic top detail perspective left side view of FIG. 2, radar object-detection sensor package (or "unit") 10 with built-in IMU 12 is attached to vehicle left side surface 15. The package 10 comprises IMU 12 having exterior face 16 and being operatively incorporated into a radar object detection printed circuit assembly (PCA) 11, the PCA 11 having exterior PCA face 17 and beam face 18, with x-y-z Cartesian coordinate's axes—the x-axis points generally/approximately towards the front of the vehicle (front-to-back), the y-axis points generally/approximately perpendicularly out from and into the body of the vehicle (left-side-to-right-side), and the z-axis points generally/approximately perpendicularly up to the sky and down to the ground (up-and-down).

The use of "generally" and/or "approximately" in this disclosure, including in sections relating to calibration and ongoing operation, to describe the axes will be understood to indicate the general orientation of the axes, without limiting each axis of the vehicle/trailer or the radar object-detection package to having one exact location at all times. This is especially important in this disclosure that focuses on observing/measuring/determining a radar object-detection sensor's actual, as-mounted position relative to a vehicle/trailer for calibration, and, after calibration, the sensor's actual in-operation position at any given time during continued operation wherein the dynamic driving of the vehicle/trailer, road conditions, and changing sensor package and vehicle/trailer condition (such as resulting from impact, damage, or wear) may change the position of the sensor relative to vehicle/trailer, gravity, the ground, and the driving direction, for example. As the position of the radar sensor and the direction of the radar signals are key factors in the accuracy of the detection signals, these methods may greatly enhance the accuracy of radar object-detection, by allowing compensation for mounting errors and undesirable dynamic motions, and/or by allowing mitigation or at least the sending of alerts regarding equipment problems.

Further, as schematically shown in FIG. 2, the IMU face 16, PCA face 17, and beam face 18, may be described as being all be co-planar, or parallel and very close to each other so as to be nearly and effectively co-planar, and, therefore, the terms "exterior face" or "radar sensor face" or "beam face" are used herein to represent a plane/face from which radar waves are emitted and to which radar-returnwaves/signals are received, and from which same plane/face the IMU incorporated into the PCA will observe (or determine, measure, or sense) during embodiments of the herein-disclosed calibration and continuing radar object detection operation discussed later in this document. While the radar object-detection sensor package will typically have a housing for protection of the PCA and other components, the outer surface of the housing will be slightly outward from the PCA and is not "exterior face" or "radar sensor face" or "beam face" described herein. Therefore, in the figures, the radar object-detection sensor package is portrayed schematically as an elongated rectangular box not showing any housing, and the outer side (outer-left in the left-side-mounting of FIG. 2, or outer-right in the right-side-mounting of FIGS. 3-5A) of that schematic box is the "exterior face" or "radar sensor face" or "beam face".

Radar object-detection sensor package 10 may be attached both to the left and right sides of the vehicle, with the right-side package (also "unit") being a mirror image of the left side package ("unit") pictured in FIG. 2. Also, for tractor-truck and trailer vehicle combinations, sensor package 10 may be placed on one or both sides of either, and near the front or back of, the tractor-truck or trailer.

Figure 3:
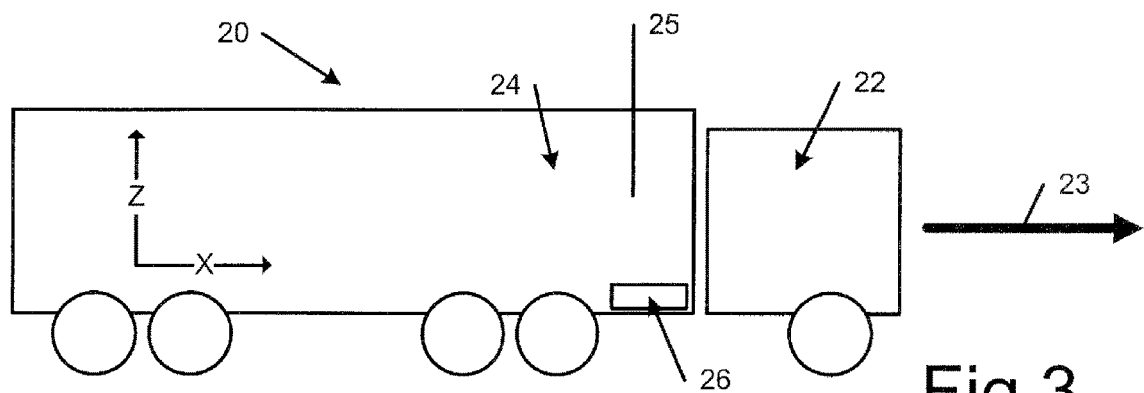
FIG. 3 is a schematic side view of a truck-tractor pulling a trailer, the trailer being equipped with a radar object-detection sensor package on a right side of the trailer according to one embodiment of the presently-disclosed technology.

In the schematic side view of FIG. 3, a tractor-truck 22 pulling a trailer 24 has radar object-detection sensor package 26, similar or the same as package 10 of FIG. 2, attached to the front right lower side surface 25 of the trailer 24.

Figure 4:
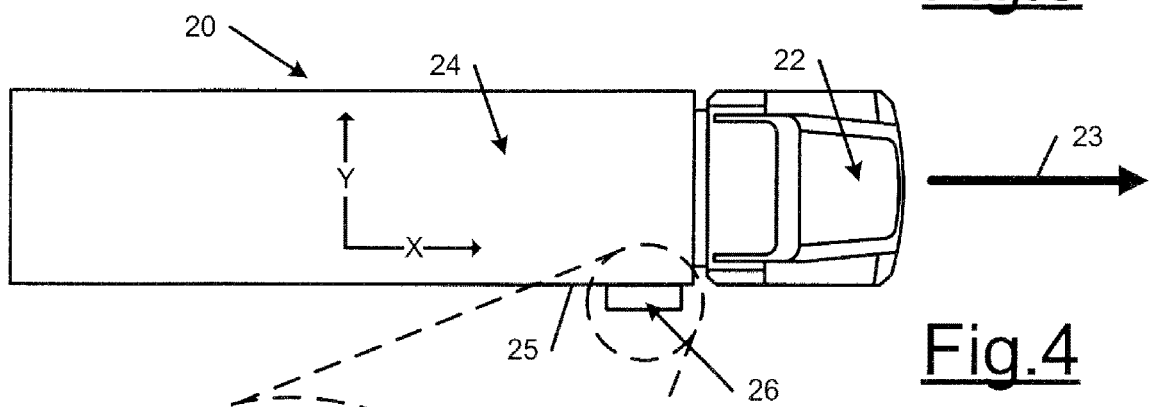
FIG. 4 is a top view of the side view depicted in FIG. 3.

In the schematic top view of FIG. 3 depicted as FIG. 4, tractor-truck 22, trailer 24 and radar object-detection sensor package 26 are shown also. In both FIGS. 3 and 4, the relevant Cartesian axes x-z for the side view and x-y for the top view are shown, as well as a bold arrow 23 showing the go-ahead movement direction of vehicle 20 generally along the x-axis. For calibration of angle alpha (α), the go-ahead movement direction (23) is preferably straight with no turning and no movement in the y-axis direction.

Figure 4A:
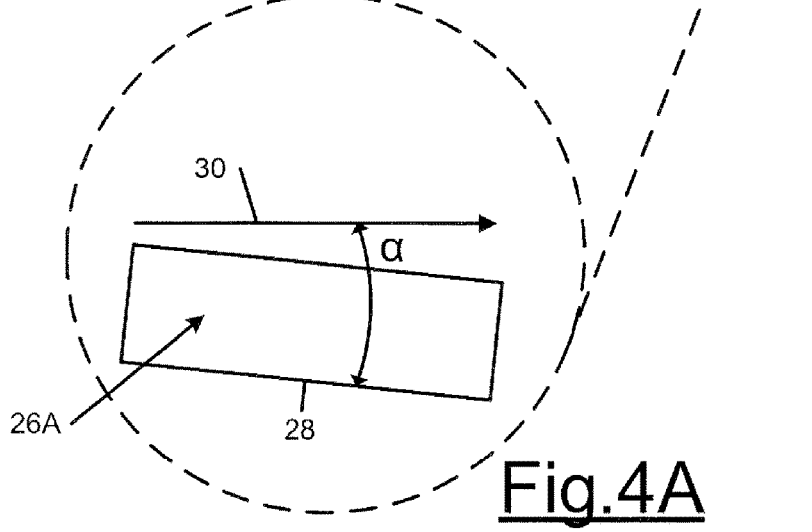
FIG. 4A is an enlarged detail view of the top view depicted in FIG. 4, but with the radar object-detection sensor package in FIG. 4A being installed at an angle (α) from the truck trailer body in the enlarged detail view.

In the enlarged detail view FIG. 4A, radar object-detection package 26A has exterior face 28, there being an offset angle α between exterior face 28 of package 26A and arrow 30, which is understood to be the straight, go-ahead movement direction 23 along the x-axis of vehicle 20, and, if the side wall 25 is planar and parallel to direction 23, also it may also be thought of as the x-axis of the outer wall 25 of trailer 24 where the package 26A is mounted. Angle α may be called a first offset angle and may be described as rotation around axis Z that has moved the package exterior face 28 away from being perfectly parallel to the x-axis of the vehicle/trailer, frequently as a result of mounting error that places the exterior face 28 at an angle, rather than parallel, to the side surface 25.

Angle alpha (α) may be described as an angle observed (or determined, measured, or sensed) between: 1) the observed position of radar sensor face or "exterior face 28" of the radar object detection package, and 2) the go-ahead movement direction of the vehicle/trailer 23. In other words, said observing of the angle alpha (α) is preferably done by observing (or determining, measuring, or sensing) and comparing the x-axis of the radar sensor face and the x-axis of the vehicle/trailer straight forward or rearward movement.

The direction 23 of the vehicle/trailer, the side surface 25, and the x-axis of the exterior face 28 should all be parallel if the package 26 is mounted perfectly to a perfectly flat, planar surface 25 that is perfectly parallel to the x-axis of the vehicle/trailer, and, if this is the case, the observed x-axis would result in a calibration offset angle alpha (α) of 0 degrees. But, given that such perfect conditions frequently do not exist or happen, observing the x-axis of the calibration according to embodiments disclosed herein will allow the imperfections to be accounted for during radar object detection operation of the imperfectly mounted package 26, and/or after the mounted package 10 is loosened from the side surface 25 due to long use, or the package or vehicle/trailer side surface is impacted, damaged, or worn. Even if a package 10 is well-mounted to a flat, planar side surface, the imperfections often inherent in manual installations are expected to result in certain embodiments in a calibration offset angle alpha (α) of up to 2 degrees, for example, or, in a superior installation, up to 1 degree for example, which could result in significant errors in object detection. In less accurate installations, or in said loosened, impacted, damaged, or worn situations, the calibration offset angle alpha (α) may be larger, and may be so large as to deserve an error alarm that calls for reinstallation or repair.

Figures 5, 5A:
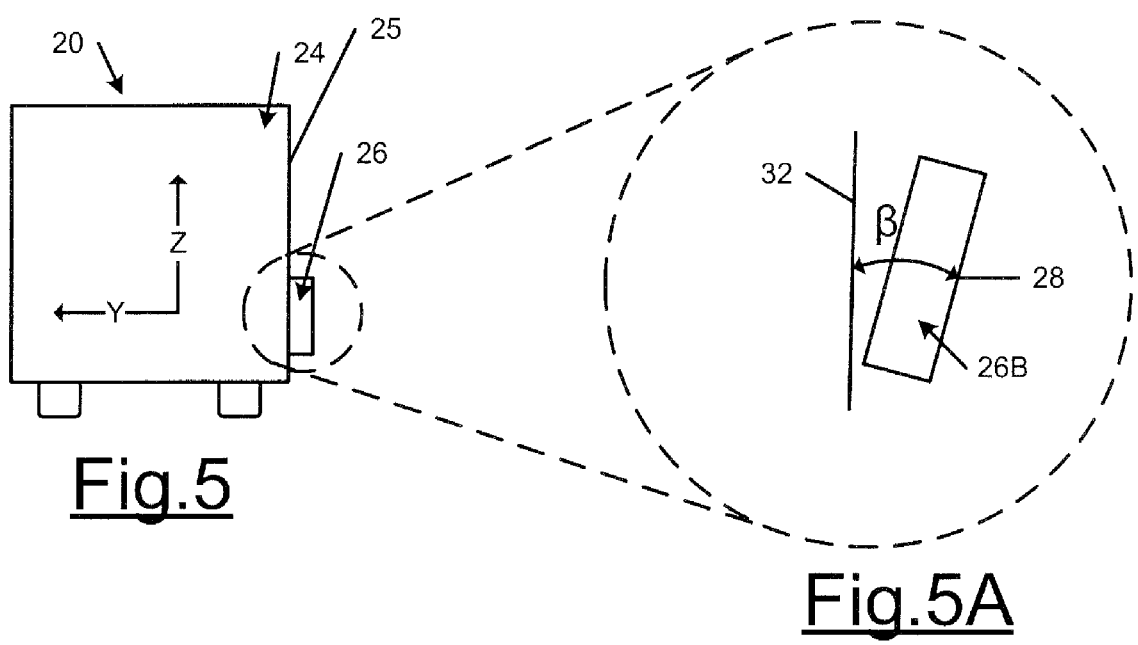
FIG. 5 is a rear view of the trailer depicted in FIGS. 3, 4 and 4A.
FIG. 5A is an enlarged detail view of the rear view depicted in FIG. 5, but with the radar object-detection sensor package in FIG. 5A being installed at an angle (β) from the truck trailer body in the enlarged detail view.

In the rear view of FIG. 5 of the vehicle 20, trailer 24 depicted in FIGS. 3, 4 and 4A, and radar object-detection sensor package 26 is shown attached to the outer wall 25 of trailer 24.

In the enlarged detail view of FIG. 5A of the rear view depicted in FIG. 5, radar object-detection sensor package 26B is shown as being installed at an angle β from the vertical line 32, which represents 1) the direction of gravitational force; 2) because the calibration is preferably done with the vehicle/trailer parked on flat ground or surface, the z-axis of the vehicle/trailer; and 3) if the side surface 25 is planar and parallel to the z-axis of the vehicle/trailer, the side surface 25. Angle β may be called a second offset angle, and may be described as rotation around axis X, which has moved the package exterior face 28 away from being perfectly parallel to the Z-axis of the vehicle/trailer, frequently as a result of mounting error that places the exterior face 28 at an angle, rather than parallel, to the side surface 25.

Angle beta (β) may be described as an angle observed (or determined, measured, or sensed) angle between: 1) the radar sensor face or "exterior face 28" of the radar object detection package/unit, and 2) the gravitational direction of the earth's gravitational field and/or the up and down, z-axis of vehicle/trailer when the vehicle is on a flat surface. Said observing of the angle beta (β) is preferably done by observing (or determining, measuring, or sensing) and comparing the z-axis of the radar sensor face and the gravitation field direction and/or z-axis of the vehicle/trailer when the vehicle/trailer is parked on flat ground and so the z-axis of the vehicle/trailer and the gravitational field should be the same or extremely close to the same.

Similarly as described above for the first offset angle alpha (α), the z-axis of the vehicle/trailer, the side surface 25, and the z-axis of the exterior face 28 should all be parallel if the package 26 is mounted perfectly to a perfectly flat, planar surface 25 that is perfectly parallel to the z-axis of the vehicle/trailer, and, if this is the case, the calibration offset angle beta (β) would be 0 degrees. But, given imperfections of mounting error, loosening, impact, damage or wear, as discussed above, calibration for beta (β), preferably in addition to calibration for alpha (α), according to embodiments disclosed herein, will allow the imperfections to be accounted for during radar object detection operation of the package 26. Said mounting imperfections are expected to result in certain embodiments in a calibration offset angle beta (β) of up to 2 degrees, for example, or, in a superior installation, up to 1 degree, which may result in significant errors in object detection. And, also as discussed above, less accurate installations, or in said loosened, impacted, damaged, or worn situations, the calibration offset angle beta (β)

may be larger, and may be so large as to deserve an error alarm that calls for reinstallation or repair.

It may be noted that certain embodiments may include calibration for mounting error caused by installing the package 26 in a position that is rotated around the y-axis. However, due to the preferred box-like shape of certain embodiments of the radar package/unit and the ability of personnel to put a level tool on the top surface of the package/unit to assist in mounting in a way that prevents such a mounting error, a "rotated around the y-axis" mounting error, if any, is typically small.

Figure 6:
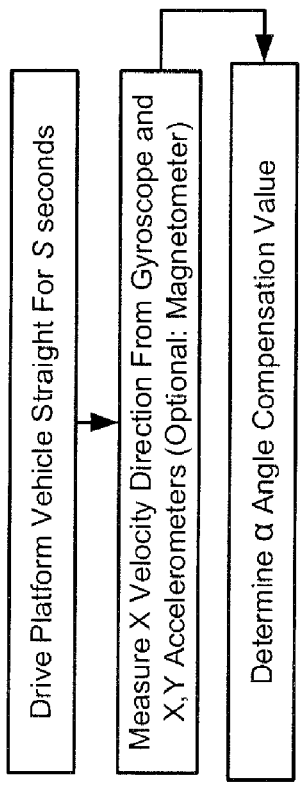
FIG. 6 is a schematic flow diagram, a Angle Initial Calibration, showing the steps to determine the alpha (α) angle according to an embodiment of the presently-disclosed technology.

In the schematic flow chart diagram of FIG. 6, there are depicted the steps of certain embodiments to initially calibrate angle α, the first offset angle.

Figure 7:
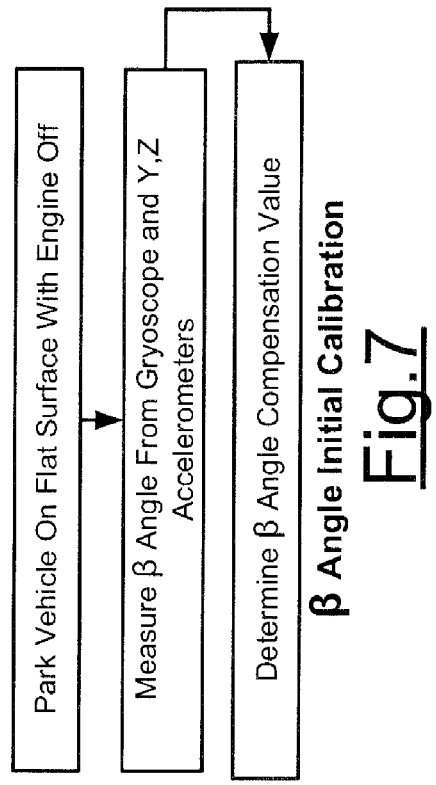
FIG. 7 is a schematic flow diagram, β Angle Initial Calibration, showing the steps to determine the beta (β) angle according to an embodiment of the presently-disclosed technology.

In the schematic flow chart diagram of FIG. 7, there are depicted the steps of certain embodiments to initially calibrate angle β, the second offset angle.

Ongoing Operation:

Certain embodiments of the presently-disclosed technology comprise apparatus and/or methods for adjusting, compensating or mitigating object detection signals/data that are affected during ongoing operation of the radar system by operational stresses such as undesirable dynamic motion and/or changes in the apparatus due to damage or wear.

The terminology and reference letters alpha prime (α'), angle beta prime (β') are used herein to help the reader/viewer in studying ongoing operation versus calibration. In both ongoing operation and calibration cases, the alpha angles indicate angles of the sensor face resulting from rotation around the z-axis, and the beta angles indicate angles of the sensor face resulting from rotation around the x-axis. However, in certain embodiments, during operation the alpha and beta angles may be observed using different apparatus, for example, different IMU components, compared to during calibration, so a prime is added to the alpha and beta angles in the operation section herein to help the reader/viewer keep track of the apparatus and methods for ongoing operation versus calibration.

Preferably, these apparatus and/or methods for adjusting, compensating or mitigating are performed after calibration of the radar system according to embodiments disclosed herein, and may be described as follows below.

1. (Measuring sideways tilt or rotation, angle β') A vehicle-mounted side-directed object-detection radar system having:
    an integral, self-contained radar object-detection package adapted for after-market installation on a side of a vehicle or on a side of a trailer adapted to be towed by a vehicle, the package having a radar sensor;
    the radar sensor having a beam face with x, y and z Cartesian coordinate axes orientation, with the x-axis being generally parallel to a straight line approximating the go-ahead movement direction of the vehicle or trailer, with the y-axis being generally parallel to a straight line approximating the horizon, and with the z-axis being generally parallel to a straight line approximating the direction of the earth's gravitational field;
    the radar sensor being adapted, when the package is installed on a side of a vehicle or trailer, to maintain a wide antenna pattern with a main lobe directed perpendicularly to the side of the vehicle or trailer so as to maintain radar coverage principally in a next-adjacent, generally-parallel road lane and a next-far-adjacent, generally-parallel road lane thereof;
    the radar system also having an Inertial Measurement Unit (IMU) containing accelerometer, gyroscope, and magnetometer components integrated together with the radar sensor in the self-contained radar object-detection package;
    the IMU being adapted to observe and measure, by a first of the components of the IMU, a rotation of the radar object-detection package about the x-axis in order to determine a tilt or rotation angle β'(beta prime), the difference between a beam face observed z-axis and the direction of the earth's gravitational field, that is, the tilt or rotation amount; and
    the self-contained radar object-detection package being adapted to enter and save the tilt or rotation angle β' for future consideration for operation of said vehicle or the trailer.

2. The vehicle-mounted side-directed object-detection radar system of item #1, wherein the IMU first component, that observes and measures the beam face observed z-axis (rotation of the radar object-detection package about the x-axis) is a z-accelerometer, and a gyroscope observes and measures the direction of the earth's gravitational field.

3. The vehicle-mounted side-directed object-detection radar system of item #1, wherein the IMU first component, that observes and measures the beam face observed z-axis (rotation of the radar object-detection package about the x-axis) is selected from a group consisting of a z-accelerometer, a y-axis accelerometer, and a combination of z-accelerometer and a y-axis accelerometer, and wherein a gyroscope observes and measures the direction of the earth's gravitational field.

Or, for example, certain embodiments may be also described by the following:

4. (Measuring bounce or vibration amount/frequency) A vehicle-mounted side-directed object-detection radar system having:
    an integral, self-contained radar object-detection package adapted for after-market installation on a side of a vehicle or on a side of a trailer adapted to be towed by a vehicle, the radar object-detection package having a radar sensor;
    the radar sensor having a beam face with x, y and z Cartesian coordinate axes orientation, with the x-axis being generally parallel to a straight line approximating the go-ahead movement direction of the vehicle or trailer, with the y-axis being generally parallel to a straight line approximating the horizon, and with the z-axis being generally parallel to a straight line approximating the direction of the earth's gravitational field;
    the radar sensor being adapted, when the radar object-detection package is installed on a side of a vehicle or trailer, to maintain a wide antenna pattern with a main lobe directed perpendicularly to the side of the vehicle or trailer so as to maintain radar coverage principally in a next-adjacent, generally-parallel road lane(s) and next-far-adjacent, generally-parallel road lane thereof;
    the radar system also having an Inertial Measurement Unit (IMU) containing accelerometer, gyroscope, and magnetometer components integrated together with the radar sensor in the self-contained radar object-detection package;
    wherein one or more of the components of the IMU are adapted to observe and measure a short-time series of changes of the radar object-detection package about or along at least one or all the x-, y-, or z-axes in order to determine a bounce or vibration amount and frequency thereof; and the radar object-detection package being adapted to enter and save the bounce or vibration amount and frequency thereof for future consideration for operation of the vehicle or the trailer.

5. The vehicle-mounted side-directed object-detection radar system of item #3, wherein the components or components of the IMU that observe and measure a short-time series of changes of the installed radar object-detection package about or along one or more or all of x-, y- or z-axes in order to determine a bounce or vibration amount and frequency thereof, is the accelerometer component within the IMU.

6. The vehicle-mounted side-directed object-detection radar system of item #5, wherein the components or components of the IMU that observe and measure a short-time series of changes to determine a bounce or vibration amount and frequency thereof is/are selected from a group consisting of an x-axis accelerometer, a y-axis accelerometer, a z-axis accelerometer, and a group of all three of the x, y, and z axis accelerometers of the accelerometer component of the IMU.

Referring Specifically to Ongoing Operation FIGS. 8-14:

In the schematic flow chart diagram of FIG. 8, there is depicted certain embodiments for utilizing the disclosed apparatus and methods, after calibration, as part of ongoing radar objection detection. Thus, FIG. 8 shows one embodiment of steps according to the invention that may be included as a feature/portion of an ongoing radar object detection process such as that in FIG. 1, for example. FIG. 8 illustrates steps, ongoing after calibration, include the continued verification of vehicle/trailer direction, continued measurement of sensor angle alpha prime ($\alpha'$) and sensor angle beta ($\beta'$) and comparison of the newly-measured sensor angles to the respective sensor angles expected from the calibration according to the presently-disclosed technology, and determining whether the comparison is within normal tolerances or whether compensation should be applied to the target detection signals/data or whether an alarm/error is warranted.

Figure 9:
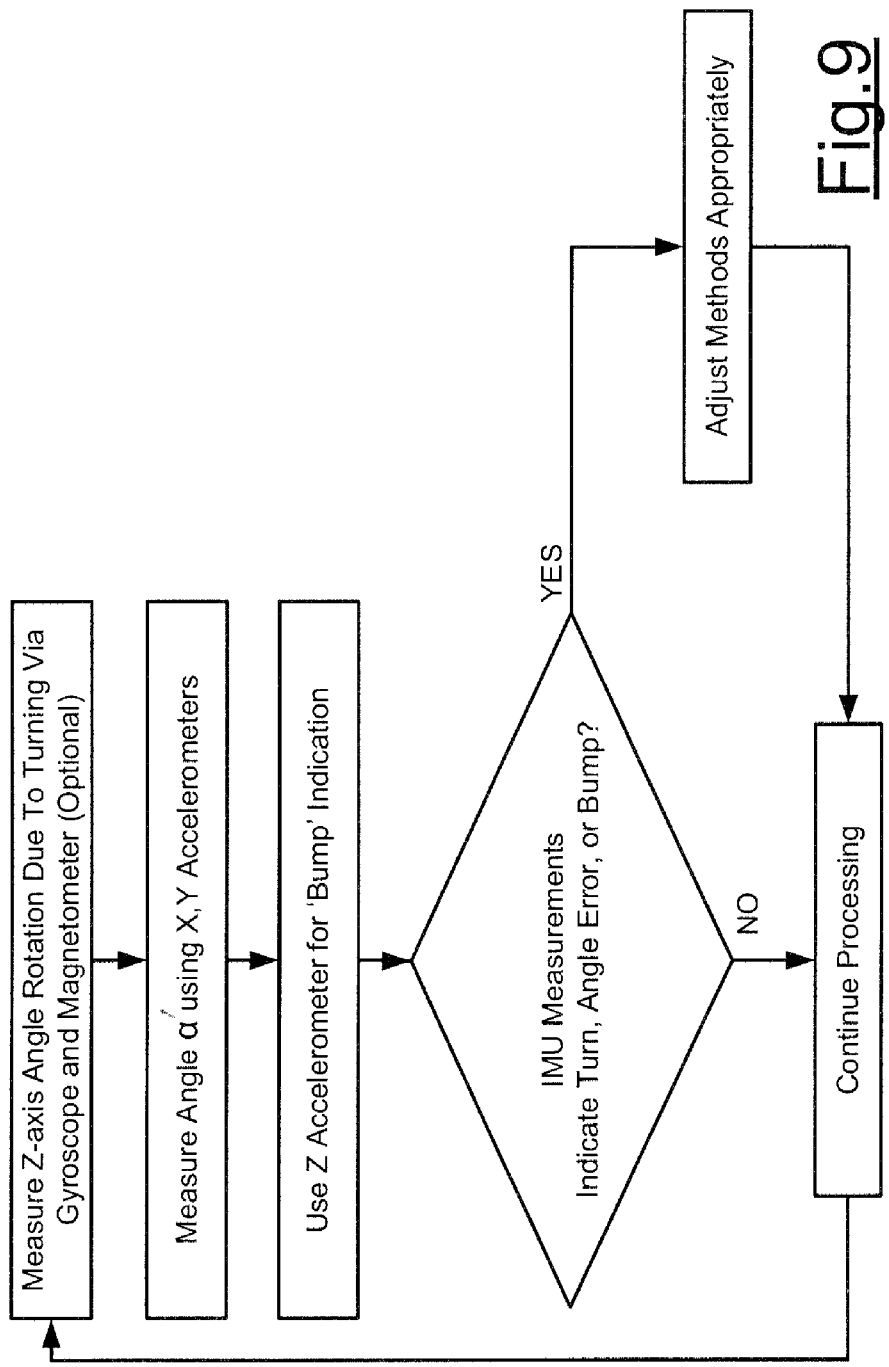
FIG. 9 is a schematic flow diagram which depicts steps to monitor the radar object detection system operation, for example, by monitoring: rotation around the z-axis due to turning, angle alpha (α) using x-axis and y-axis accelerometers, and the z-axis accelerometer for "bump" indications, and, if necessary, adjust for vehicle/trailer turning, angle error, or bump indications, according to one embodiment of the presently-disclosed technology.

FIG. 9 is a schematic flow diagram which depicts certain embodiments of steps to monitor the radar object detection system operation, for example, by monitoring: rotation around the z-axis due to turning, angle alpha prime ($\alpha'$) using x-axis and y-axis accelerometers, and the z-axis accelerometer for "bump" indications, and, if necessary, adjust for vehicle/trailer turning, angle error, or bump indications, according to one embodiment of the presently-disclosed technology.

Figure 10:
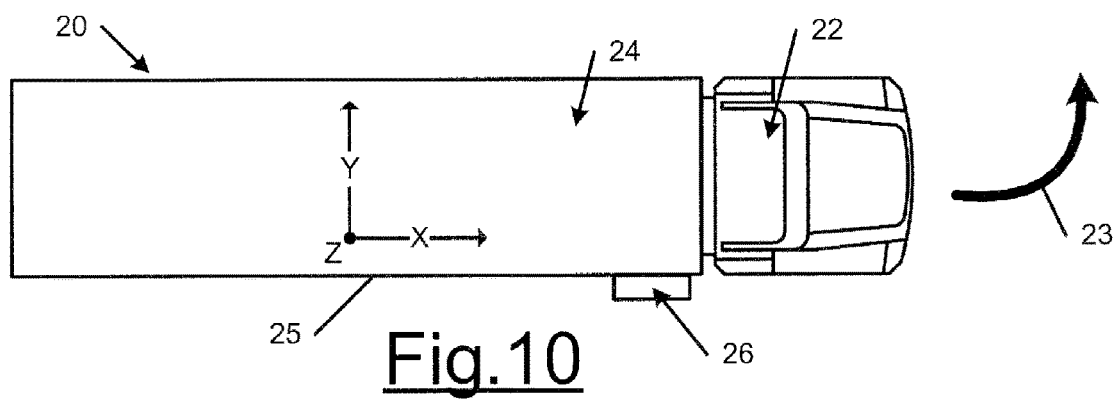
FIG. 10 is a top schematic view like the one in FIG. 4, except with the vehicle and trailer turning to the left.

FIG. 10 is a top schematic view like the one in FIG. 4, except with the vehicle 20 comprising tractor-truck 22 pulling a trailer 24 trailer turning to the left as indicated by arrow 23'. As will be understood from the description above of FIG. 4, x, y and z axes, the side surface 25 of the trailer 24, and a radar sensor package 26 are illustrated. As disclosed earlier in this document, multiple or alternative components or data-sources may be used to determine a straight-ahead condition of the vehicle/trailer, and therefore also turning, for example, in certain embodiments, In certain embodiments, alternatively or additionally to a gyroscope component, GPS heading information and/or vehicle CAN (controller area network) steering position data, may be used to indicate the turning/moving-straight condition, or in certain circumstances or environments, a magnetometer may be instead or additionally used.

Figure 11:
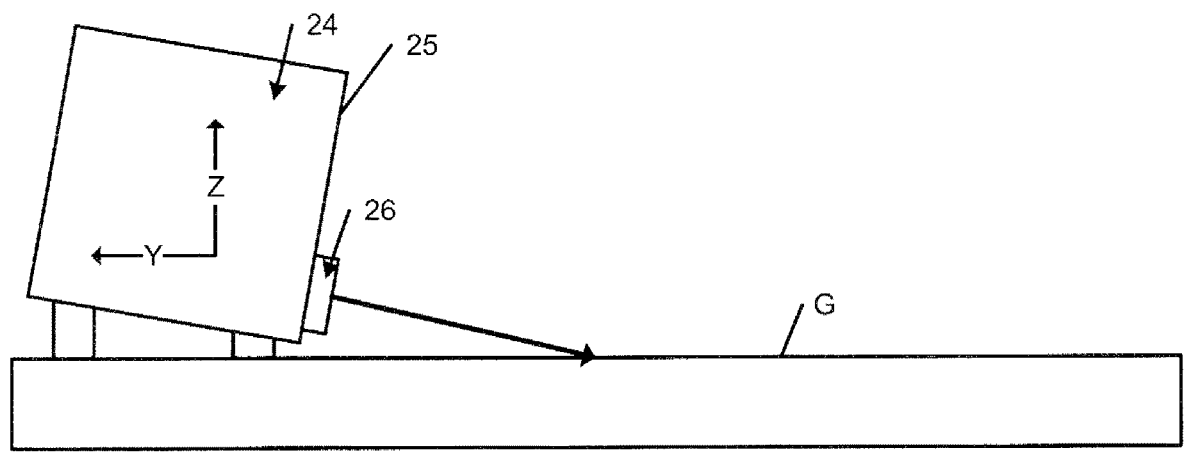

FIG. 11 is a rear schematic view like the one in FIG. 5, but with the trailer swaying/tilting to the right due to the turning in FIG. 10, which turning and the resulting swaying/tilting may be monitored and adjusted-for, for example, as in FIG. 9. In addition to y and x axes, trailer 24, and the package 26 being labeled in FIG. 11, the ground G is labeled and is understood to mean a ground surface or other surface on which the vehicle is moving.

FIG. 12 is a rear schematic view like the one in FIG. 5.

FIG. 12A is an enlarged schematic detail view of the rear view of FIG. 12, but showing the radar object-detection sensor package 26 moving up-and-down, for example, because the vehicle/trailer (20/24) and therefore the sensor package 26 mounted thereon are undergoing a bump such as may be caused by a pothole or a speed bump, or the vehicle/trailer and therefore the sensor package 26 mounted thereon are undergoing up and down vibrations, or the sensor package 26 is vibrating up and down separately from the vehicle/trailer due to damage or mounting problems. In FIG. 12A, the package undergoing an up-and-down bounce or vibrations is shown next to vertical line 32 that represents the direction of gravitational force, or, in certain embodiments as will be understood from this disclosure, the z-axis of the vehicle/trailer or the side surface 25 of trailer 24.

FIG. 13 is a rear schematic view like the one in FIGS. 5 and 12.

FIG. 13A is an enlarged schematic detail view of the rear view of FIG. 13, but with the radar object-detection sensor package moving side-to-side, for example, because the vehicle/trailer vehicle/trailer and therefore the sensor package mounted thereon are undergoing side-to-side vibrations, or the sensor package is vibrating side-to-side due to damage or mounting problems. In FIG. 13A, the package 26 undergoing an side-to-side vibrations is shown next to vertical line 32 that represents the direction of gravitational force, or, in certain embodiment as will be understood from this disclosure, the z-axis of the vehicle/trailer or the side surface 25 of trailer 24.

FIG. 14 is a schematic flow diagram that depicts certain embodiments of steps to monitor up-and-down (FIG. 12A) or side-to-side vibrations (see FIG. 13A), by using the UMI according to certain embodiments of the presently-disclosed technology, wherein the vibrations are analyzed as to whether or not they are within pre-established tolerances, and if not, the vibration signals are further analyzed and directed to mitigation if possible, or, if mitigation is not possible, to an error/alert system that will alert the driver or other personnel about the vibration(s).

Table below describes certain embodiments of steps of observation (or determining, measuring, or sensing) during ongoing operation using an IMU apparatus or individual components thereof.

TABLE 1

| During Operation (after calibration), IMU Measurement of: | By IMU method/feature: | Compare to value expected from calibration, to adjust/mitigate: | If adjust/ mitigate Angle of Target, which Angle of Target? |
|---|---|---|---|
| Angle alpha prime ($\alpha'$) - rotation around Z-axis | X-axis and Y-axis accelerometers for angle measurement and gyroscope for turning during operation (Magnetometer and/or GPS/GNSS or other vehicle CAN data could also be used, if available) | Both measured Azimuth angle may be corrected or an error signal may be issued if correction can not be achieved | Azimuth Angle |

TABLE 1-continued

| During Operation (after calibration), IMU Measurement of: | By IMU method/feature: | Compare to value expected from calibration, to adjust/mitigate: | If adjust/ mitigate Angle of Target, which Angle of Target? |
|---|---|---|---|
| Angle beta prime (β') - Rotation around x-axis | Y-axis and Z-axis accelerometers for angle measurement and gyroscope to determine if vehicle is tilting | Elevation angle of target, to account for tilt of radar to the ground | Elevation Angle |
| Angle resulting from Rotation around y-axis | X-axis and Z-axis accelerometers | Typically, not used in any adjustment/mitigation due to usually small mounting errors | Elevation and Azimuth Angles |
| z-axis accelerations | Z-axis accelerometer for bumps during operation. | Identify induced targets due to severe bump (pothole, speed bump, etc.) | — |
| x-axis vibration | X-axis accelerometer | Used to adjust/mitigate Doppler Velocity errors, and can also be reported as error (BIST) | — |
| y-axis vibration | Y-axis accelerometer | Used to adjust/mitigate Doppler Velocity errors, and can also be reported as error (BIST) | — |
| z-axis vibration | Z-axis accelerometer | Used to adjust/mitigate Doppler Velocity errors, and can also be reported as error (BIST) | — |

Although this disclosed technology has been described above with reference to particular means, materials, and embodiments of apparatus and methods, it is to be understood that the presently-disclosed technology is not limited to these disclosed particulars, but extends instead to all equivalents within the broad scope of this disclosure, including the Table, Figures, and Claims herein.

The invention claimed is:

1. A dynamic misalignment error correction system for a vehicle-mounted side-directed object-detection radar system comprising:
   an integral, self-contained radar object-detection sensor package adapted for after-market installation on a side of a vehicle or on a side of a trailer adapted to be towed by a vehicle, the radar object-detection sensor package comprising a radar sensor;
   the radar sensor comprising a beam face with x, y and z Cartesian coordinate axes orientation, with said beam face being attached to the radar object-detection sensor package so that the x-axis of the beam face is generally parallel to a straight line approximating the straight, go-ahead or go-back movement direction of the vehicle or trailer, the beam face y-axis is generally parallel to a straight line approximating the horizon, and the beam face z-axis is generally parallel to a straight line approximating the direction of the earth's gravitational field;
   said radar sensor also being adapted, when installed on a side of a vehicle or trailer, to maintain a wide antenna pattern with a main lobe directed perpendicularly to the side of the vehicle or trailer so as to maintain radar coverage principally in next-adjacent, generally-parallel road lanes and next-far-adjacent, generally-parallel road lanes thereof;
   said radar sensor also comprising an incorporated Inertial Measurement Unit (IMU) containing accelerometer, gyroscope, and magnetometer components integrated together with said radar sensor in the self-contained radar object-detection sensor package;
   the IMU being adapted to observe, by a first of the components of the IMU, an observed first x-axis of the radar sensor face, during a straight, go-ahead or go-back movement direction of the vehicle or trailer along a vehicle movement observed second x-axis, in order to determine an offset angle α that is the difference between the radar sensor face observed first x-axis and the observed second x-axis;
   the straight, go-ahead or go-back movement of the vehicle being confirmed by a second of the components of the IMU adapted to detect any movement of the vehicle or trailer along the y-axis; and
   said self-contained radar object-detection sensor package being adapted to enter and save to send for future consideration the offset angle α for correction of any relevant radar sensor measurement.

2. The dynamic misalignment error correction system of claim 1, wherein the first component of the IMU is adapted to observe acceleration or deceleration in movement along the observed second x-axis in order to determine the offset angle α and is the x-axis accelerometer component within the IMU.

3. The dynamic misalignment error correction system of claim 1, wherein the second component of the IMU that is adapted to detect any movement of the vehicle or trailer along the y-axis, is the gyroscope component within the IMU.

4. A dynamic misalignment error correction system for a vehicle-mounted side-directed object-detection radar system comprising:
   an integral, self-contained radar object-detection sensor package adapted for after-market installation on a side of a vehicle or on a side of a trailer adapted to be towed by a vehicle, said radar object-detection sensor package comprising a radar sensor;
   said radar sensor comprising a beam face with x, y and z Cartesian coordinate axes orientation, with said beam face being attached to said radar object-detection sensor package so that the x-axis of the beam face is generally parallel to a straight line approximating the straight, go-ahead or go-back movement direction of the vehicle or trailer, the y-axis of the beam face is generally parallel to a straight line approximating the horizon, and the z-axis of the beam face is generally parallel to a straight line approximating the direction of the earth's gravitational field;
   said radar sensor being adapted, when said radar object-detection sensor package is installed on a side of a vehicle or trailer, to maintain a wide antenna pattern with a main lobe directed perpendicularly to the side of the vehicle or trailer so as to maintain radar coverage principally in next-adjacent, generally-parallel road lanes and the next-far-adjacent, generally-parallel road lanes thereof;
   said radar sensor also comprising an incorporated Inertial Measurement Unit (IMU) containing accelerometer, gyroscope, and magnetometer components integrated together with said radar sensor in said self-contained radar sensor package;

the IMU being adapted to observe by a first component of the IMU an observed first z-axis of the radar sensor face, in order to determine an offset angle β that is the difference between the radar sensor face observed first z-axis and a gravitational field direction that is an observed second z-axis; and said self-contained radar object-detection sensor package being adapted to enter and save to send for future consideration the offset angle β for correction of any relevant radar sensor measurement.

5. The dynamic misalignment error correction system of claim 4, wherein the first component of the IMU that is adapted to observe the first z-axis in order to determine the offset angle β is the z-axis accelerometer component within the IMU.

6. The dynamic misalignment error correction system of claim 4, wherein the vehicle or trailer is parked on a flat surface during observation of the observed first z-axis and the observed second z-axis, so that the vehicle or trailer is not tilted and not turning.

7. A dynamic misalignment error correction system for a vehicle-mounted side-directed object-detection radar system comprising:

an integral, self-contained radar sensor package adapted for after-market installation on a side of a vehicle or on a side of a trailer adapted to be towed by a vehicle, said radar sensor package comprising a radar sensor;

said radar sensor comprising a beam face with x, y and z Cartesian coordinate axes orientation, with said beam face being attached to said radar object-detection package so that the x-axis of the beam face is generally parallel to a straight line approximating the straight, go-ahead or go-back movement direction of the vehicle or trailer, the y-axis of the beam-face is generally parallel to a straight line approximating the horizon, and the z-axis of the beam face is generally parallel to a straight line approximating the direction of the earths' gravitational field;

said radar sensor being adapted, when said radar object-detection sensor package is installed on a side of a vehicle or trailer, to maintain a wide antenna pattern with a main lobe directed perpendicularly to the side of the vehicle or trailer, so as to maintain radar coverage principally in next-adjacent, generally-parallel road lanes and next-far-adjacent, generally-parallel road lanes thereof;

said radar sensor also comprising an incorporated IMU (Inertial Measurement Unit) containing accelerometer, gyroscope, and magnetometer components integrated together with said radar sensor in said self-contained radar sensor package;

the IMU being adapted to observe, by a first of the components of the IMU, an observed first x-axis of the radar sensor face, during a straight, go-ahead or go-back movement direction of the vehicle or trailer along an observed second x-axis, in order to determine an offset angle α that is the difference between the radar sensor face observed first x-axis and the vehicle movement direction observed second x-axis;

the straight, go-ahead or go-back movement of the vehicle or trailer being confirmed by a second component of said IMU adapted to detect any movement of the vehicle or trailer along the y-axis;

said radar sensor further comprising a third component of said IMU adapted to observe an observed first z-axis of the radar sensor face, in order to determine an offset angle β that is the difference between the radar sensor face observed first z-axis and a gravitational field direction that is an observed second z-axis generally corresponding to the downward and upward direction of the trailer in the earth's gravitational field; and said self-contained radar object-detection sensor package being adapted to enter and save to send for future consideration the first offset angle α and the second offset angle β for correction of any relevant sensor measurement.

8. The dynamic misalignment error correction system of claim 7, wherein said first component of the IMU is adapted to observe acceleration or deceleration of movement along the observed second x-axis in order to determine offset angle α and is the x-axis accelerometer component within the IMU.

9. The dynamic misalignment error correction system of claim 7, wherein said second component of said IMU that is adapted to detect any movement of the vehicle or trailer along the y-axis, is the gyroscope component within said IMU.

10. The dynamic misalignment error correction system of claim 7, wherein said third component of said IMU that is adapted to observe the observed first z-axis in order to determine the offset angle β is the z-axis accelerometer component within the IMU.

11. The dynamic misalignment error correction system of claim 7, wherein the vehicle or trailer is parked on a flat surface during observation of the observed first z-axis and the observed second z-axis, so that the vehicle or trailer is not tilted and not turning.

12. A vehicle-mounted side-directed object-detection radar system comprising:

an integral, self-contained radar object-detection package adapted for after-market installation on a side of a vehicle or on a side of a trailer adapted to be towed by a vehicle, the package comprising a radar sensor;

the radar sensor having a beam face with x, y and z Cartesian coordinate axes orientation, with the x-axis being generally parallel to a straight line approximating the go-ahead movement direction of the vehicle or trailer, with the y-axis being generally parallel to a straight line approximating the horizon, and with the z-axis being generally parallel to a straight line approximating the direction of the earth's gravitational field;

the radar sensor being adapted, when the package is installed on a side of a vehicle or trailer, to maintain a wide antenna pattern with a main lobe directed perpendicularly to the side of the vehicle or trailer so as to maintain radar coverage principally in a next-adjacent, generally-parallel road lane and a next-far-adjacent, generally-parallel road lane thereof;

the radar system also comprising an Inertial Measurement Unit (IMU) containing accelerometer, gyroscope, and magnetometer components integrated together with the radar sensor in the self-contained radar object-detection package;

the IMU being adapted to observe and measure, by a first of the components of the IMU, a rotation of the radar object-detection package about the x-axis in order to determine a tilt or rotation angle β'(beta prime), the difference between a beam face observed z-axis and the direction of the earth's gravitational field, that is, the tilt or rotation amount; and the self-contained radar object-detection package being adapted to enter and save the tilt or rotation angle β' for future consideration for operation of said vehicle or the trailer.

13. The vehicle-mounted side-directed object-detection radar system of claim 12, wherein the IMU first component, that observes and measures the beam face observed z-axis is a z-accelerometer, and a gyroscope observes and measures the direction of the earth's gravitational field.

14. The vehicle-mounted side-directed object-detection radar system of claim 12, wherein the IMU first component, that observes and measures the beam face observed z-axis is selected from a group consisting of a z-accelerometer, a y-axis accelerometer, and a combination of z-accelerometer and a y-axis accelerometer, and wherein a gyroscope observes and measures the direction of the earth's gravitational field.

15. A vehicle-mounted side-directed object-detection radar system comprising:
    an integral, self-contained radar object-detection package adapted for after-market installation on a side of a vehicle or on a side of a trailer adapted to be towed by a vehicle, the radar object-detection package comprising a radar sensor;
    the radar sensor having a beam face with x, y and z Cartesian coordinate axes orientation, with the x-axis being generally parallel to a straight line approximating the go-ahead movement direction of the vehicle or trailer, with the y-axis being generally parallel to a straight line approximating the horizon, and with the z-axis being generally parallel to a straight line approximating the direction of the earth's gravitational field;
    the radar sensor being adapted, when the radar object-detection package is installed on a side of a vehicle or trailer, to maintain a wide antenna pattern with a main lobe directed perpendicularly to the side of the vehicle or trailer so as to maintain radar coverage principally in a next-adjacent, generally-parallel road lane(s) and next-far-adjacent, generally-parallel road lane thereof;
    the radar system also comprising an Inertial Measurement Unit (IMU) containing accelerometer, gyroscope, and magnetometer components integrated together with the radar sensor in the self-contained radar object-detection package;
    wherein one or more of the components of the IMU are adapted to observe and measure a short-time series of changes of the radar object-detection package along at least one of the x-, y-, or z-axes in order to determine a bounce or vibration amount and frequency thereof; and
    the radar object-detection package being adapted to enter and save the bounce or vibration amount and frequency thereof for future consideration for operation of the vehicle or the trailer.

16. The vehicle-mounted side-directed object-detection radar system of claim 15, wherein the one or more components of the IMU that observe and measure a short-time series of changes of the installed radar object-detection package along at least one of the x-, y- or z-axes in order to determine a bounce or vibration amount and frequency thereof, is the accelerometer component within IMU.

17. The vehicle-mounted side-directed object-detection radar system of claim 15, wherein the components or components of the IMU that observe and measure a short-time series of changes to determine a bounce or vibration amount and frequency thereof is/are selected from a group consisting of an x-axis accelerometer, a y-axis accelerometer, a z-axis accelerometer, and a combination of all three of the x-axis, y-axis, and z-axis accelerometers.

* * * * *